United States Patent [19]

Van De Griend

[11] Patent Number: 4,752,026
[45] Date of Patent: Jun. 21, 1988

[54] METHOD OF SECURING TWO PARTS TO EACH OTHER

[75] Inventor: Jan M. Van De Griend, Dordrecht, Netherlands

[73] Assignee: U.S. Philips Corporation, New York, N.Y.

[21] Appl. No.: 935,061

[22] Filed: Nov. 21, 1986

Related U.S. Application Data

[63] Continuation of Ser. No. 797,742, Nov. 7, 1985, which is a continuation of Ser. No. 508,222, Jun. 27, 1983.

[30] Foreign Application Priority Data

Jun. 28, 1982 [NL] Netherlands .......................... 8202597

[51] Int. Cl.$^4$ ............................................. B23K 11/04
[52] U.S. Cl. ...................................... 228/120; 219/98
[58] Field of Search ............................. 228/120, 175; 219/91.21, 98, 99, 93; 156/272.2, 273.9, 274.4, 91, 92, 272.4, 380.4

[56] References Cited

U.S. PATENT DOCUMENTS

| 3,614,375 | 10/1971 | Becker | 219/91 |
| 3,629,544 | 12/1971 | Becker | 219/93 |
| 3,774,009 | 11/1973 | Hodges | 219/98 |
| 3,975,611 | 8/1976 | Gordan | 219/98 |
| 4,120,641 | 10/1978 | Myles | 228/120 |
| 4,130,751 | 12/1978 | Gordon | 219/98 |

FOREIGN PATENT DOCUMENTS 0205116 12/1982 Japan .................................. 228/120

Primary Examiner—Nicholas P. Godici
Assistant Examiner—Carmine Cuda
Attorney, Agent, or Firm—Algy Tamoshunas; Brian J. Wieghaus

[57] ABSTRACT

The invention relates to a method of securing a first part made of a thermoplastic material to a second part made of an electrically conductive material, a connector means of an electrically conductive material being placed in the part made of a thermoplastic material and subsequently being welded to the part made of an electrically conductive material. A metal ball is used for the connector, which ball is inserted into an opening in the first part and is brought into contact with the second part, after which the ball is welded to the second part by means of a welding electrode.

12 Claims, 2 Drawing Sheets

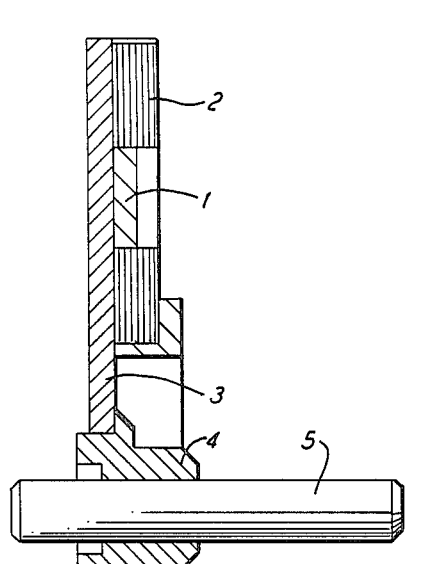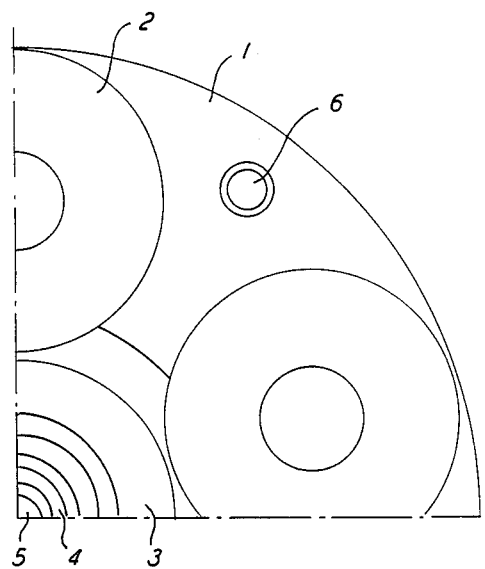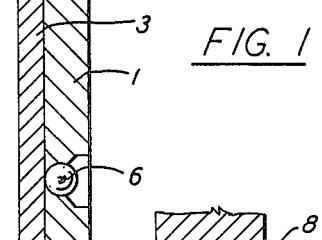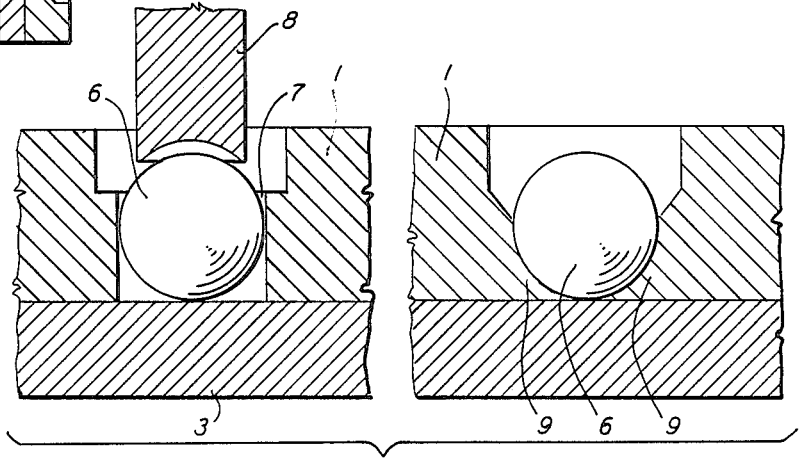
FIG. 1
FIG. 2
FIG. 3

4,752,026

METHOD OF SECURING TWO PARTS TO EACH OTHER

This is a continuation of application Ser. No. 797,742, filed Nov. 7, 1985 and now abandoned, which is a continuation of application Ser. No. 508,222, filed June 27, 1983 and now abandoned.

BACKGROUND OF THE INVENTION

The invention relates to a first method of securing a first part to a second part made of an electrically conductive material, a connecting means made of an electrically conductive material being arranged in the first part and subsequently being welded to the second part.

Such a method is known from, for example, Netherlands Patent Specification No. 70987. This method employs connecting means of a special shape, which moreover have to be brought into a well-defined position relative to the parts to be secured to each other.

SUMMARY OF THE INVENTION

The invention aims at providing a method which can be readily automated and which employs simple connecting means.

According to the invention the method is characterized in that a metal ball is used as the connecting means. The ball is arranged in an opening in the first part, which is made of a thermoplastic material, and is brought into contact with the second part, after which the ball is welded to the second part by means of an electrode.

The ball forms a fixing means which, as a result of its shape, does not have a preferred position. The supply of a ball to and its insertion into an opening in the first part can therefore be readily mechanized, so that the method in accordance with the invention is well suited for mass production.

During welding of the ball to the second part heat is developed, causing the thermoplastic material of the first part in the region of the ball to melt. As is shown clearly in the drawing, the welding current and pressure are selected so that the ball retains a generally spherical shape after welding, thereby defining a region or space between the ball, where portions of it overhang the second part, and the second part. The space between the ball and the second part is then filled at least partly, so that after cooling the first part is secured to the second part.

The invention also relates to a second method of securing a first part to a second part made of an electrically conductive material, a connecting means made of an electrically conductive material being welded to the second part.

According to the invention this method is characterized in that a metal ball is employed as the connecting means which ball is brought into contact with the second part and is welded to the second part by means of an electrode, after which the first part, which is made of a plastic material, is fitted. The ball slides into an opening in the first part, in which opening it is secured by clamping.

Preferably, the opening in the first part is provided with a constriction, which may be formed by a circumferential rim which projects into the opening or by one or more protrusions which project into the opening. When the first part is fitted, the greater part of the ball slides past the constriction, so that a sort of snapped connection is formed between the first part and the ball.

This method is also very suitable for mass production and has the additional advantage that it is not necessary for the material of the first part to have specific plasticizing properties. The first part may therefore be a part made of a thermosetting plastic or a thermoplastic material.

Both methods may be used in various fields in the mechanical-engineering and electrical-engineering industries, in particular in those cases where, for example, a plastics part is to be secured permanently to a metal part.

Fields in which the invention may be used are for example: the manufacture of cars, toys, domestic appliances etc.

The invention also provides a product comprising two parts which are secured to one another by one of the methods.

Embodiments of the invention will now be described in more detail, by way of example with reference to the drawings.

BRIEF DESCRIPTION OF THE DRAWING

FIG. 1 is a sectional view of a rotor of an electric motor, two parts of which are connected to each other by one of the methods in accordance with the invention.

FIG. 2 is a view of a sector of the rotor shown in FIG. 1.

FIG. 3 shows two sectional views on an enlarged scale, taken at the location of the ball in different stages of the first method.

BRIEF DESCRIPTION OF PREFERRED EMBODIMENTS

Figure 4:
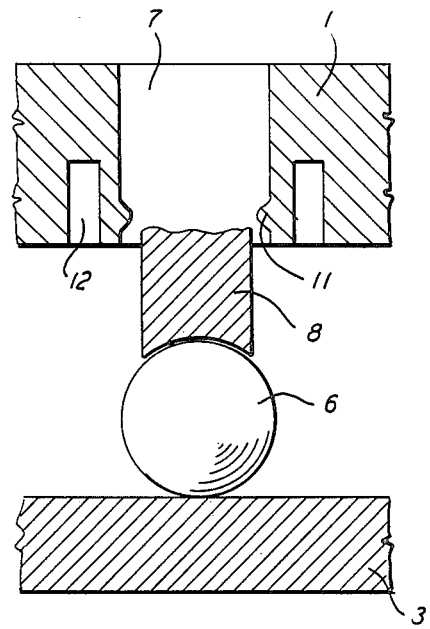
FIG. 4 is a sectional view on an enlarged scale, taken at the location of the ball in one of the stages of the second method.

The rotor shown in FIGS. 1 and 2 comprises a disc 1 made of a thermoplastic material, for example, a thermoplastic synthetic resin. A plurality of coils 2 are arranged in the disc 1, which coils are regularly distributed around the periphery of the disc. The disc 1 is mounted on the shaft 5 of the rotor by means of a flange 3 on a hub 4.

For securing the plastic disc 1 to the flange 3, which is made of an electrically conductive material such as metal, metal balls 6 are used. The disc 1, which in the present case constitutes the aforementioned first part made of a thermoplastic material, is formed with openings 7 in the form of through bores in the disc. At least at the end of the opening 7 adjoining the flange 3, the opening has a diameter generally equal to that of the ball 6.

A ball 6 is inserted into an opening 7 and is brought into contact with the aforementioned second part, constituted by the flange 3. Subsequently, the ball 6 is brought into contact with the electrode 8 of a welding apparatus, known per se (see the left-hand half of FIG. 3). The flange 3 is connected into the electric circuit of the welding apparatus with a polarity opposite to that of the electrode 8, so that the ball 6 is thereby welded to the flange 3. Since the disc 1 is made of a thermoplastic material, the heat developed during welding causes the thermoplastic material of the disc 1 in the region of the ball 6 to melt and at least partly fill the space 9 between the overhanging portions 16 of the ball 6 and the flange 3 (see the right-hand half of FIG. 3). As a result of this and of the adhesion of the material of the disc 1 to the ball 6 and the flange 3, a firm fixture of the disc 1 to the flange 3 is obtained.

Figure 5:
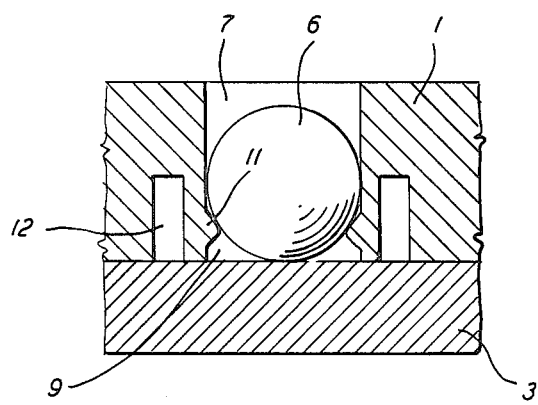
FIG. 5 is a sectional view, similar to that of FIG. 4, in a later stage of the second method.

The second method of securing the disc 1 to the flange 3 will now be described with reference to FIGS. 4 and 5. First, a ball 6 is brought into contact with the flange 3. Subsequently, the flange 3 is connected into an electric circuit of a welding apparatus with a polarity opposite to that of the electrode 8, so that the ball 6 is welded to the flange 3. After this the electrode 8 is removed and the disc 1 is pressed onto the flange 3 (see FIG. 5), the ball 6 being slidably snapped into the opening 7 past a circumferential rim 11. In the final stage the rim 11 is situated in the space 9 between the ball 6 and the flange 3. The abutment of the rim 11 against the ball 6 ensures a firm fixture of the disc 1 to the flange 3. In order to facilitate mounting of the disc 1, this disc is provided with a continuous groove 12 in the present example.

What is claimed is:

1. A method of securing a first part made of thermoplastic material to a second part made of electrically conductive material by a securing means with overhanging portions made of electrically conductive material, comprising the steps of:
   (a) forming a through bore in said first part;
   (b) bringing said first part into contact with said second part such that one end of said through bore is covered by said second part;
   (c) inserting said securing means in said through bore such that said securing means contacts said second part thereby defining a space between said overhanging portions of said securing means and said second part;
   (d) arranging a welding electrode to contact said securing means; and
   (e) energizing said welding electrode whereby said securing means is welded to said second part and portions of said first part in the vicinity of said space are melted to fill at least partly said space defined by said through bore, said overhanging portions of said securing means, and said second part, whereby upon cooling said first part is secured to said welded electrically conductive parts only by the displaced melted portions of said first part.

2. A method according to claim 1, wherein said securing means comprises a ball having a substantially spherical shape with a given diameter.

3. The method according to claim 2, wherein said through bore is formed to have a diameter which is smaller at said one end of said bore than at the other end of said bore.

4. A product comprising a first part made of thermoplastic material, a second part made of electrically conductive material, and a ball made of electrically conductive material for securing said first part to said second part, wherein said first part has a through bore formed therein for receiving said ball, said ball is welded to said second part, and said first part is secured to said welded second part and ball, only by means of portions of the thermoplastic material of said first part which occupy a space between said ball and said second part only after having undergone melting.

5. A product according to claim 4, wherein said ball has a substantially spherical shape with a given diameter.

6. The product according to claim 5 wherein said through bore is formed to have a diameter at the end of said bore remote from said second part which is greater than the diameter of said ball, and a diameter at the end of said bore covered by said second part which is less than the diameter of said ball.

7. A method of securing a first part made of thermal plastic material to a second part made of electrically conductive material, by a securing means with overhanging portions made of electrically conductive material, comprising the steps of:
   (a) forming a through bore in said first part;
   (b) bringing said first part into contact with said second part, such that said one end of said through bore adjoins and is covered by said second part;
   (c) inserting said securing means in said through bore such that said securing means contacts said second part thereby defining a space between said overhanging portions of said securing means and said second part;
   (d) arranging a welding electrode to contact said securing means;
   (e) selecting a welding current and pressure such that said securing means will retain said overhanging portions after being welded to said second part and such that welding heat will cause portions of said first part in the vicinity of said space to be melted; and
   (f) applying said selected pressure and energizing said welding electrode with said selected current so as to weld said securing means to said second part, said securing means retaining said overhanging portions after welding so as to maintain said space between said second part and said overhanging portions, and said portions of said first part in the vicinity of said space flowing so as to fill at least partly said space, whereby upon cooling said first part is secured to said welded electrically conductive parts only by the displaced melted portions of said first part.

8. A method according to claim 7, wherein said securing means comprises a ball having a substantially spherical shape with a given diameter.

9. The method according to claim 8, wherein said through bore is formed to have a diameter which is smaller at said one end of said bore than at the other end of said bore.

10. A product comprising a first part made of thermal plastic material, a second part made of electrically conductive material and a securing means made of electrically conductive material for securing said first part to said second part,
    said first part having a through bore formed therein for receiving said securing means, said securing means being welded to said second part and having a shape such that portions of said securing means overhang said second part to define a space therebetween, said first part being secured to said welded electrically conductive parts only by portions of the thermal plastic material forming said first part, said portions of said thermal plastic material having been caused to flow into said space by the heat liberated during welding of said securing means to the second part.

11. A product according to claim 10, wherein said securing means comprises a ball having a substantially spherical shape with a given diameter.

12. The product according to claim 11, wherein said through bore is formed to have a diameter at the end of said bore remote from said second part which is greater than the diameter of said ball, and a diameter at the end of said bore covered by said second part which is less than the diameter of said ball.

* * * * *